Patented Dec. 2, 1930

1,783,771

UNITED STATES PATENT OFFICE

FRANZ BECKER, OF DESSAU IN ANHALT, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF MAKING CELLULOSE ESTERS OF BOTH NITRIC ACID AND AN ORGANIC ACID

No Drawing. Application filed January 7, 1928, Serial No. 245,254, and in Germany January 15, 1927.

The present invention relates to a new process for manufacturing cellulose esters deriveted both from nitric acid and an organic acid. The process is characterized by a very gentle treatment of the cellulose whereby no harmful degradation of the cellulose molecule occurs; for instance there is no injurious formation of hydro-cellulose which impairs the quality of the finished mixed ester and detracts from the viscosity of its solution.

The process consists in partially esterifying a cellulose material, that is to say, cellulose or a conversion product thereof, according to any suitable known manner with an organic esterifying agent and then treating the mixture with nitric acid. The partially esterified cellulose is in a doughy condition when the nitric acid is added, so that it mixes well with the latter; nitration begins at once. Since the esterification is soon at an end the free nitric acid rapidly disappears and cannot act harmfully upon the metal of the apparatus. The rapid course of the reaction ensures a good quality of the esterified cellulose complex which means an improvement in the final product as compared with the products of the usual processes. The process may be applied by any method of esterification provided that the catalyst used does not influence or inhibit the action of the nitric acid.

For the new process all catalysts known for cellulose acylation are suitable, provided they do not harmfully interact with the nitric acid. By way of example sulfuric acid, phosphoric acid, sulfonic acids, and bromine may be cited.

From the clear solution free from fibre the mixed esters of cellulose can be isolated in the highly esterified form; generally, however, hydrolysis must be performed in the usual manner, as described in U. S. Patent No. 838,350 in order to obtain products of the best solubility. The products are characterized by a low nitrogen content which generally will not exceed 3%.

It is generally advantageous to use the cellulose in a condition in which it presents a large surface, for instance cotton in a comminuted condition, that is to say in the form of short loose fibres. In this manner uniform distribution of the catalyst in the cellulose and the ease of esterification are considerably aided.

The following examples illustrate the invention, the parts being by weight:—

Example 1.—100 parts of bleached short fibrous cotton, 500 parts of acetic acid of 99% strength and 1 part of sulfuric acid of 95% strength are shaken together in a flask for 6 hours at 20° C. Then the mass is introduced into a kneading apparatus and 350 parts of acetic anhydride are added. When, after about 3–5 hours, an homogeneous fibrous magma is formed, 4.2 parts of concentrated sulfuric acid, dissolved in 23 parts of glacial acetic acid and then after about 5 minutes 12.5 parts of nitric acid of 98–100% strength, also dissolved in glacial acetic acid, are added. At the temperature of 30–40° C. the solution becomes free from fibre in the course of 1 hour. The conversion into a product soluble in acetone follows for instance the procedure described in German specification No. 252,706. The finished nitro-acetyl-cellulose contains about 1.5% of nitrogen. Films obtained from it are of good strength and their lengthening in water amounts to only 30–40% of that of pure acetyl-cellulose.

Example 2.—100 parts of ground cotton in loose condition, 400 parts of glacial acetic acid and 0.75 part of sulfuric acid of 95 per cent strength are stirred together for 6 hours at about 20° C. in a kneading apparatus. 300 parts of acetic acid anhydride are then added whereby the temperature may rise above 30° C. After about 3 hours there is produced a uniform fibrous mass from which no liquid can be expressed. To this mass are added 12.5 parts of nitric acid of 98–100 per cent strength dissolved in 25 parts of glacial acetic acid. After 15 minutes, 4.2 parts of concentrated sulphuric acid, dissolved in 23 parts of glacial acetic acid are added. These quantities of nitric acid and sulphuric acid may be added together, or the sulphuric acid may be added first and then the nitric acid. After about an hour the mass is free from fibres. The hydrolysis follows in the manner described in Example 1. There is obtained a nitro-acetyl-cellulose containing 1.67 per cent of nitrogen. The film made from it has good strength and a hygroscopicity amounting to 30–40 per cent of that of pure acetyl cellulose.

*Example 3.*—Into a mixture of 400 parts of glacial acetic acid, 350 parts of acetic anhydride and 4 parts of bromine are introduced 100 parts of bleached linters comminuted to a loose condition and the whole is shaken or stirred at 20–30° C. until a fibrous mass is produced, from which no liquid can be expressed. About 12 hours are necessary for obtaining this condition. Within 10 minutes there are then added, while kneading well or stirring, 4.2 parts of concentrated sulphuric acid (of 95 per cent strength) diluted with glacial acetic acid, and there are further added in the course of 5 minutes 12.5 parts of nitric acid (98–100 per cent strength) also dissolved in glacial acetic acid. The mixture is maintained for about an hour at 30–40° C. The fibres have then disappeared and the mass is thick and whitish. There is then added diluted sulphuric acid as prescribed in German specification No. 252,706 and the mass is hydrolyzed to the desired solubility in acetone. In this manner there is obtained a nitro-acetyl-cellulose having 1.2 per cent of nitrogen. Its properties are similar to those of the product of Example 2.

*Example 4.*—100 parts of bleached cotton comminuted and loose, 400 parts of glacial acetic acid and 10 parts of phosphoric acid of 96 per cent strength are stirred or shaken together for 1 hour at 20–25° C. There are then added 350 parts of acetic anhydride while the temperature is raised gradually to 60° C. After about 4 hours the acetylation has proceeded to about the stage of monoacetate (up to about 29 per cent of acetic acid). To the soft, fibrous mass there are now added 4.2 parts of concentrated sulphuric acid dissolved in glacial acetic acid and then 12.5 parts of nitric acid of 98–100 per cent strength, preferably also dissolved in glacial acetic acid. The temperature may then rise to 40° C. or even higher. After 1–1¼ hours no more fibres can be detected. The whitish turbid mass is hydrolyzed up to the desired degree of solubility of the nitro acetate by addition of dilute sulfuric acid. The nitrogen content of the nitro-acetyl-cellulose obtained is 1.3 per cent; the solutions of the products are remarkably clear with a high viscosity.

In the foregoing examples there may be substituted for the acetic anhydride corresponding quantities of another suitable organic acid anhydride, for instance propionic acid anhydride. So also instead of the acetic acid another suitable diluent, preferably a suitable organic acid may be added.

What I claim is:

1. A process for the manufacture of cellulose esters derived both from nitric acid and an organic acid which comprises treating a cellulose material with an organic esterifying agent in the presence of an acylation catalyst which will not react with nitric acid and in the course of the process, when a partial esterification has been obtained, reacting on the intermediate product with nitric acid.

2. A process for the manufacture of cellulose esters derived both from nitric acid and an organic acid which comprises treating a cellulose material with an organic acid anhydride in the presence of an acylation catalyst which will not react with nitric acid and in the course of the process, when a partial esterification has been obtained, reacting on the intermediate product with nitric acid.

3. A process for the manufacure of cellulose esters derived both from nitric acid and an organic acid which comprises treating a cellulose material with acetic acid anhydride in the presence of sulfuric acid as a catalyst and in course of the process, when a partial esterification has been obtained, reacting on the intermediate product with nitric acid.

In testimony whereof, I affix my signature.

FRANZ BECKER.